Patented Mar. 9, 1948

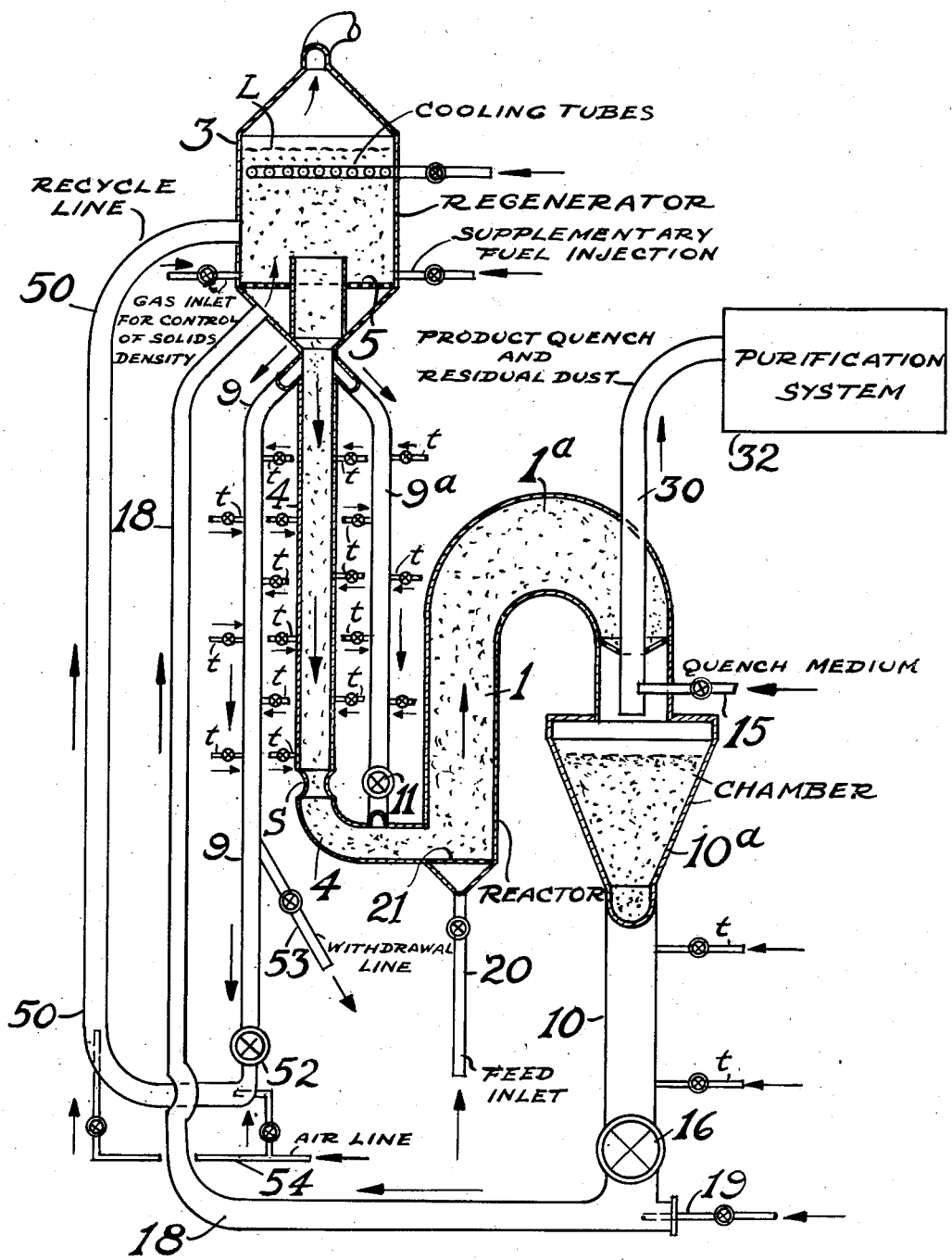

2,437,334

UNITED STATES PATENT OFFICE 2,437,334

CONTROLLING CHEMICAL REACTIONS

Bruno E. Roetheli, Cranford, N. J., assignor to Standard Oil Development Company, a corporation of Delaware Application November 23, 1944, Serial No. 564,812

8 Claims. (Cl. 260—680)

The present invention relates to the novel features hereinafter fully disclosed in the specification and claims submitted in connection with the accompanying drawing.

There are many chemical reactions which require short contact times, that is to say, the period during which the reaction takes place must be rigidly limited to prevent undesired side reactions and consequent loss of yield of the desired product. A good example of such a process is the dehydrogenation of butenes to form butadiene, although there are many others.

It has been found desirable to conduct various chemical reactions at essentially constant conditions of temperature since the use of so-called "adiabatic" reaction procedures involves precise compromises with respect to the relative rates of primary and secondary or side reactions so that product uniformity from the inlet end of the reaction zone to the outlet generally approximates only a desirable average.

In order to carry on catalytic processes with maximum selectivity it has been considered preferable to conduct such processes at the most satisfactory temperature possible throughout the reaction zone.

The mechanics of achieving such conditions in conventional externally heated equipment are relatively simple when the reaction in question involves substantially no serious problem of heat of reaction. When, however, substantial heat effects exist, one is limited by the temperature level imposed by the material through which the heat must be transferred, which makes commercial realization of some reactions very difficult or impracticable because of limitations imposed by expensive construction or by the properties of existing materials of construction. Similarly, if all the heat is to be supplied in the inlet gas, the difference between inlet and exit gas temperature is often so great as to increase significantly the catalyst volume required, and the maintenance of definite reaction rates from point to point is impossible. Moreover, in order to obtain substantial conversions to the desired product the higher than desirable inlet temperature required to guarantee adequate production rates also favors the occurrence of undesirable side or secondary reactions.

The main object of the present invention is to conduct chemical reactions carried out in the presence of a solid catalyst material, under conditions such that a short duration of reaction time at the most favorable reaction temperatures is attained in an expeditious and efficient manner.

A corollary of the next preceding object of my invention involves the utilization of the so-called "fluid-solid technique" in achieving the desired results.

Other and further objects of the present invention will appear from the following more detailed description and claims.

In the accompanying drawing I have shown diagrammatically a form of apparatus in which a preferred modification of my invention may be carried into effect.

Referring in detail to the drawing, I provide a high speed reactor, a catalyst regenerator, and a quenching means so arranged and disposed as to effect a short "contact time" or short period of reaction time, of a reactant, such as butene, undergoing dehydrogenation that I may prevent undesired side reactions as follows:

I represents a high speed reactor (converse of a "delayed settler") which, as can be seen, consists essentially of a cylindrical case which is in communication with a regenerator 3 by means of a standpipe 4, the regenerator being disposed above the reactor 1, whereby as will subsequently appear more fully, a natural flow of regenerated catalyst from the regenerator to the reactor may occur. Referring to the reactor, it will be noted that it curves or bends in the portion of 1—a into the frusto-conical upper portion of a vertical cylindrical vessel or chamber 10.

In operating the process, the feed which may be, say, butene, enters the system through line 20 and passes upwardly through a distributing screen or grid 21 into the reactor. Meanwhile catalyst is withdrawn from the regenerator 3 via the said standpipe 4 and also discharges into the reactor where it intermixes with the butene. To facilitate flow of the material in the standpipe 4, the same is provided with a plurality of taps $t$ into which a slow current of a gasiform material, such as inert gas, natural gas or the like, is fed, the gasiform material serving to fluidize the column of catalyst flowing downwardly in the standpipe 4 and to render it freeflowing, similar to water, for example. It will be noted also that the standpipe 4 has a constriction S at a point near the bottom thereof for the purpose of imposing a pressure differential between the reaction zone and the regenerator standpipe.

The mixture of butene, gas, and catalyst flows upwardly in the reactor 1 at a velocity of ½ to 25 ft. per second, passes through 1a and thence into the frusto-conical expanded portion of 10—a of vessel 10 where the catalyst separates out by gravity and/or centrifugal action, while the product passes upwardly through a pipe 30 to a purification system 32 for butadiene recovery, in the example given.

It will be recalled that the main purpose of this invention was to provide means for limiting catalytic chemical reactions to relatively short periods of time and high reaction temperature level. In the present process I accomplish this by quickly removing most of the catalyst from the reaction products and quenching the gaseous product by introducing through line 15 a quenching material which discharges directly into the interior of product-drawoff pipe 30 as shown. This quenching material may be any cold inert material, preferably a condensable liquid with high latent heat, or it may be a cold solid such as fine sand, catalyst, etc., since additional dust separation is available in a subsequent portion of the system.

Referring to the separated catalyst material in pipe or vessel 10, the same is withdrawn through a standpipe carrying flow control valve 16 and discharged into a pipe 18 into which air or other free oxygen-containing gas is also discharged through line 19 to form therein a mixture of suspension which is conveyed pneumatically by pipe 18 to the regenerator where the catalyst, which in the case of butene dehydrogenation has become contaminated with impurities, is purified by proper treatment as regeneration temperatures in known manner and reactivated.

Flow conditions in the regenerator of the air or other oxygen-containing gas are controlled within the limits of, say, ½–5 ft. per second, preferably 1½ to 3 ft. per second, so that there is formed in the regenerator 3 a dense suspension having an upper level l, in which condition the contaminants on the catalyst are removed by combustion thereof. As is known, the temperature in 3 is of the order of 1075° F. to 1500° F. The regenerated catalyst is then withdrawn through pipe 4 as previously indicated.

A common expedient in the operation of a device like 3 is to provide a screen member 5 through which the suspension passes and provides good distribution in the regeneration of the gas and/or solids. In order to control the level L in the regenerator 3, I provide a valved drawoff pipe 9 in communication with the standpipe 4, as shown, through which I may withdraw catalyst as is necessary to keep the level of the dense suspension at some desired point. I have not shown the withdrawal of regeneration fumes from regenerator 3, for that method of handling these regeneration fumes is known. They are simply passed through a solid separating device, such as a "cyclone" separator or Cottrell precipitator, to separate fines in the catalyst and then the hot gases may be passed through heat exchangers and/or waste heat boilers or the like to recover at least a portion of their sensible heat. As previously indicated, the main bulk of the catalyst separates from the flue gases in the regenerator 3 and only the very fine portions pass overhead with the off-gases so that the gas space above L in regenerator 3 contains only minor amounts of catalyst particles.

As to conditions for butene dehydrogenation, the following are set forth with the understanding, however, that I have used the dehydrogenation of butene merely to illustrate my process and not to limit it thereto for it is applicable to many chemical processes where a short time is required to prevent undesired side reactions, or for other reasons. As to butene conditions in reactor 1, the following give desired results:

Temperature_____ 1050° F. to 1250° F.
Contact time_____ ½–5 seconds.
Catalyst_____ Molybdenum oxide, chromium oxide, molybdenum sulfide, chromium sulfide, nickel sulfide, tungsten sulfide, or, in fact, any known dehydrogenation catalyst selected from the II, IV, V, VI, and VIII group of the periodic system.
Catalyst size_____ 100–500 mesh.

It will be noted that in the drawing there are certain modifications which have not been described. For example, there is an auxiliary standpipe 9a carrying a flow control valve 11. The standpipe 4, which might be termed the constant flow standpipe, maintains a constant supply of fluid catalyst to the reaction zone for a given catalyst bulk density and fluidizing gas rate. The auxiliary standpipe with the valve 11 is used to adjust the total amount of catalyst passing to the reaction zone, depending upon the need for smaller or higher catalyst concentrations as dictated by variations in feed composition or heat available in the regenerated catalyst. In other words, suppose that the temperature in the reaction zone became too low, heat could be added by means of additional catalyst by opening valve 11. The positioning of the regeneration vessel 3 above the reactor makes possible the feeding of great quantities of catalyst.

Another modification not specifically mentioned up to this point is the catalyst recycle line 50 having flow control valve 52 which recycle line is an extension of line 9. The utility of this auxiliary standpipe is first to permit withdrawal of catalyst through line 53 or to permit recycle of catalyst back to the regenerator in order to control "hold up" of said catalyst therein, or, in other words, the amount of catalyst which is maintained therein. Another use of the recycle catalyst line is to control temperatures in the regenerator 3.

Numerous modifications of my invention will readily suggest themselves to those who are familiar with this art.

What I claim is:

1. The method of conducting an endothermic chemical reaction in the presence of a solid catalyst in powdered condition at a high temperature with a short contact time between reaction material and catalyst which comprises establishing an elevated reservoir of hot powdered catalyst, establishing a reaction zone at a substantially lower level, establishing a column of hot powdered catalyst in fluidized condition between said reservoir and said reaction zone, providing for a continuous open flow of catalyst from the bottom of said column into said reaction zone, admixing with catalyst leaving said column a gaseous reactant, causing said gaseous reactant to flow at a sufficiently high velocity to carry said hot powdered catalyst through said reaction zone concurrently with said reactant and at substantially the same velocity to where the catalyst with gaseous products of the reaction are discharged from the reaction zone at its outlet, said velocity being preselected to provide the desired short contact time between catalyst and reactant, abruptly separating said powdered catalyst from gaseous products of reaction at the outlet of said reaction zone, quenching the products of reaction at the point of separation thereof from said catalyst and controlling the temperature of said reaction zone by controlling the temperature and level of said body of hot powdered catalyst in said elevated reservoir.

2. The method of claim 1 in which the catalyst separated from the suspension is withdrawn by gravity from the separation zone, formed into a suspension with an oxygen-containing gas and returned to the said elevated reservoir where it undergoes regeneration for further use in the process.

3. The method of claim 1 in which the reactant is butene.

4. The method of claim 1 in which the catalyst is a heavy metal oxide having a particle size of from 100–500 mesh.

5. An apparatus of the character described comprising in combination an elevated catalyst regeneration vessel, means for maintaining powdered catalyst in a fluidized condition at an adjustable level in said regeneration vessel, a reaction vessel positioned below said regeneration vessel, a standpipe connecting the regeneration vessel with the reaction vessel so as to conduct a natural flow of the fluidized catalyst from the regeneration vessel to a bottom inlet of the reaction vessel, means for introducing a gasiform reactant into the bottom inlet of the reaction vessel so as to pick up and carry along in suspension through the reactor to its upper outlet the fluidized catalyst flowing from the standpipe, said outlet of the reactor being substantially below the level of fluidized catalyst in the regeneration vessel, a catalyst separating device at the outlet of the reaction vessel for directly receiving the catalyst suspension discharged from the reaction vessel and for separating by centrifugal action and gravity the catalyst from gaseous products of reaction, and means for injecting a quenching medium into the gaseous products of reaction immediately as they are separated from the catalyst discharged into the separating device.

6. The combination set forth in claim 5 including an auxiliary standpipe connecting the regeneration vessel to the bottom inlet of the reaction vessel, and a valve means disposed in said auxiliary standpipe for controlling the amount of fluidized catalyst fed to the reaction vessel therethrough.

7. The combination set forth in claim 5 including a conduit for conducting fluidized catalyst in suspension from the separating device to the regeneration vessel.

8. An apparatus of the character described for controlling chemical reactions of short duration comprising in combination a vertically disposed standpipe for containing a column of fluidized solid catalyst, a cylindrical reactor having a bottom inlet connected to receive a continuous open flow of fluidized catalyst from its column at a bottom outlet of the standpipe, means for flowing gasiform reactant material into the inlet of the reactor so as to carry along in suspension the fluidized catalyst flowing from the standpipe upwardly through the reactor to its upper outlet, a catalyst separating device directly receiving the catalyst suspension discharged from the outlet of the reactor, and means for injecting a quenching medium into gasiform material abruptly as it is separated from the catalyst suspension being discharged into the separating device.

BRUNO E. ROETHELI.

REFERENCES CITED

The following references are of record in the file of this patent:

UNITED STATES PATENTS

| Number | Name | Date |
|---|---|---|
| 1,763,609 | Weaver et al. | June 10, 1930 |
| 2,209,215 | Gaylor | July 23, 1940 |
| 2,253,486 | Belchetz | Aug. 19, 1941 |
| 2,302,209 | Goddin | Nov. 17, 1942 |
| 2,376,833 | Teter | May 22, 1944 |
| 2,399,050 | Martin | Apr. 23, 1946 |
| 2,405,395 | Bahlke et al. | Aug. 6, 1946 |

FOREIGN PATENTS

| Number | Country | Date |
|---|---|---|
| 115,689 | Australia | Aug. 20, 1942 |